Sept. 2, 1941.  M. W. DITTO  2,254,600
GAS AND LIQUID CONTACT APPARATUS
Filed Dec. 15, 1939  4 Sheets-Sheet 1

Inventor
M. W. Ditto,
Seymour, Bright
+ Nottingham
Attorneys

Sept. 2, 1941.  M. W. DITTO  2,254,600
GAS AND LIQUID CONTACT APPARATUS
Filed Dec. 15, 1939  4 Sheets-Sheet 2

Inventor
M. W. Ditto,
Seymour, Bright
& Nottingham
Attorneys

Sept. 2, 1941.  M. W. DITTO  2,254,600
GAS AND LIQUID CONTACT APPARATUS
Filed Dec. 15, 1939  4 Sheets-Sheet 3

Inventor
M. W. Ditto,
By Seymour, Bright & Nottingham
Attorneys

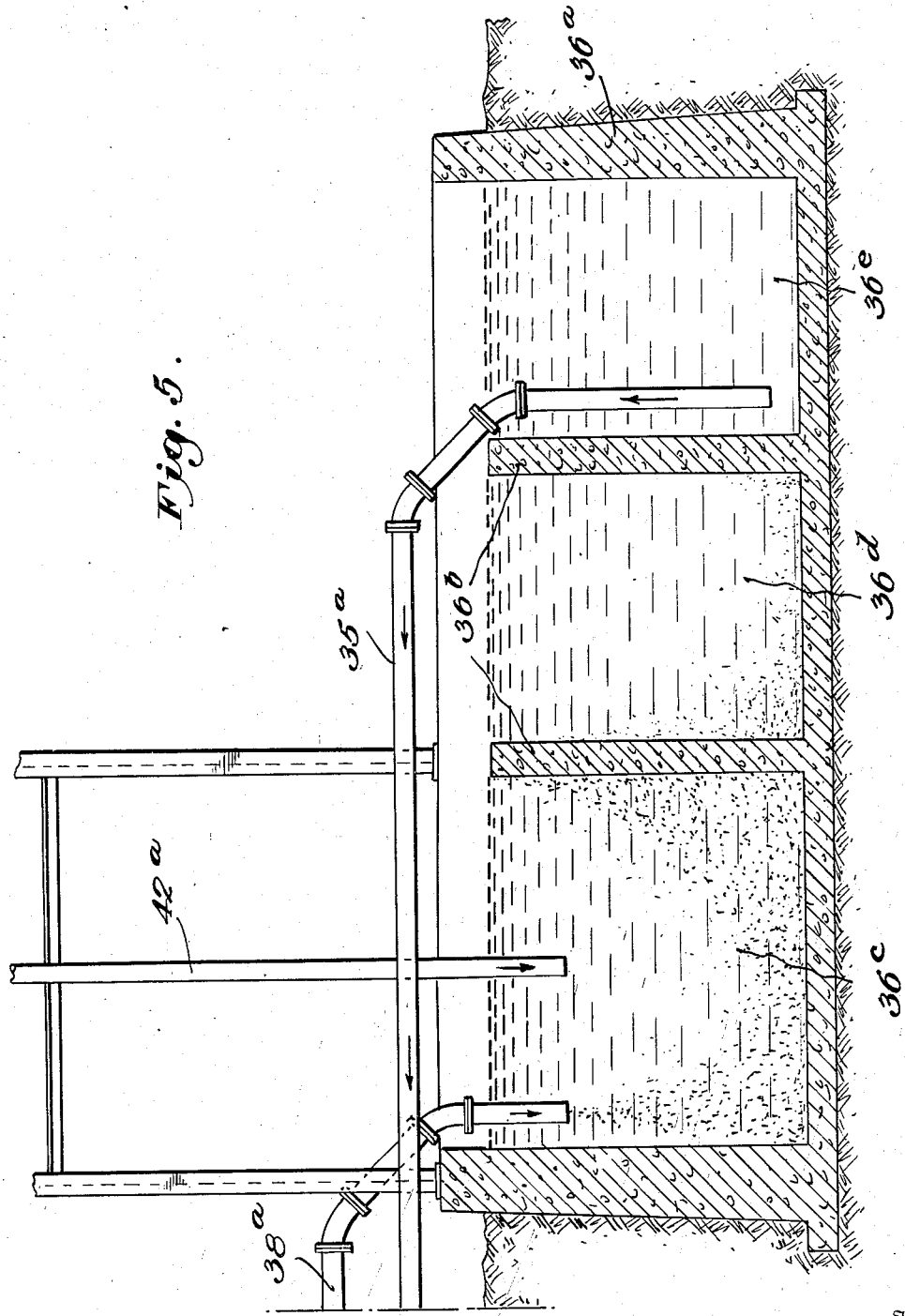

Patented Sept. 2, 1941

2,254,600

UNITED STATES PATENT OFFICE 2,254,600

GAS AND LIQUID CONTACT APPARATUS

Marvin W. Ditto, New York, N. Y., assignor to Emulsions Process Corporation, New York, N. Y., a corporation of Delaware Application December 15, 1939, Serial No. 309,503

5 Claims. (Cl. 261—92)

This invention relates to improvements in contact apparatus. More particularly, it pertains to an apparatus for treating gases carrying vapors, liquids and/or solids.

The primary purpose of the invention is to provide a novel system whereby gases carrying liquefiable vapors and/or suspended solids, may be finely dispersed within an absorbent or other liquid, so as to increase superficial contact and thereby increase the efficiency and capacity of the apparatus.

With the foregoing and other objects in view, the invention consists in the novel features of construction illustrated in the accompanying drawings, it being understood that modifications, alterations and changes may be made therein, within the scope of the appended claims without departing from the spirit of the invention as defined by such claims.

In the drawings:

Fig. 5 is a vertical, sectional view, partly in elevation, of a suitable tank to be employed with the tower when the latter is employed for the separation of suspended solid particles from a gas.

Figure 1:
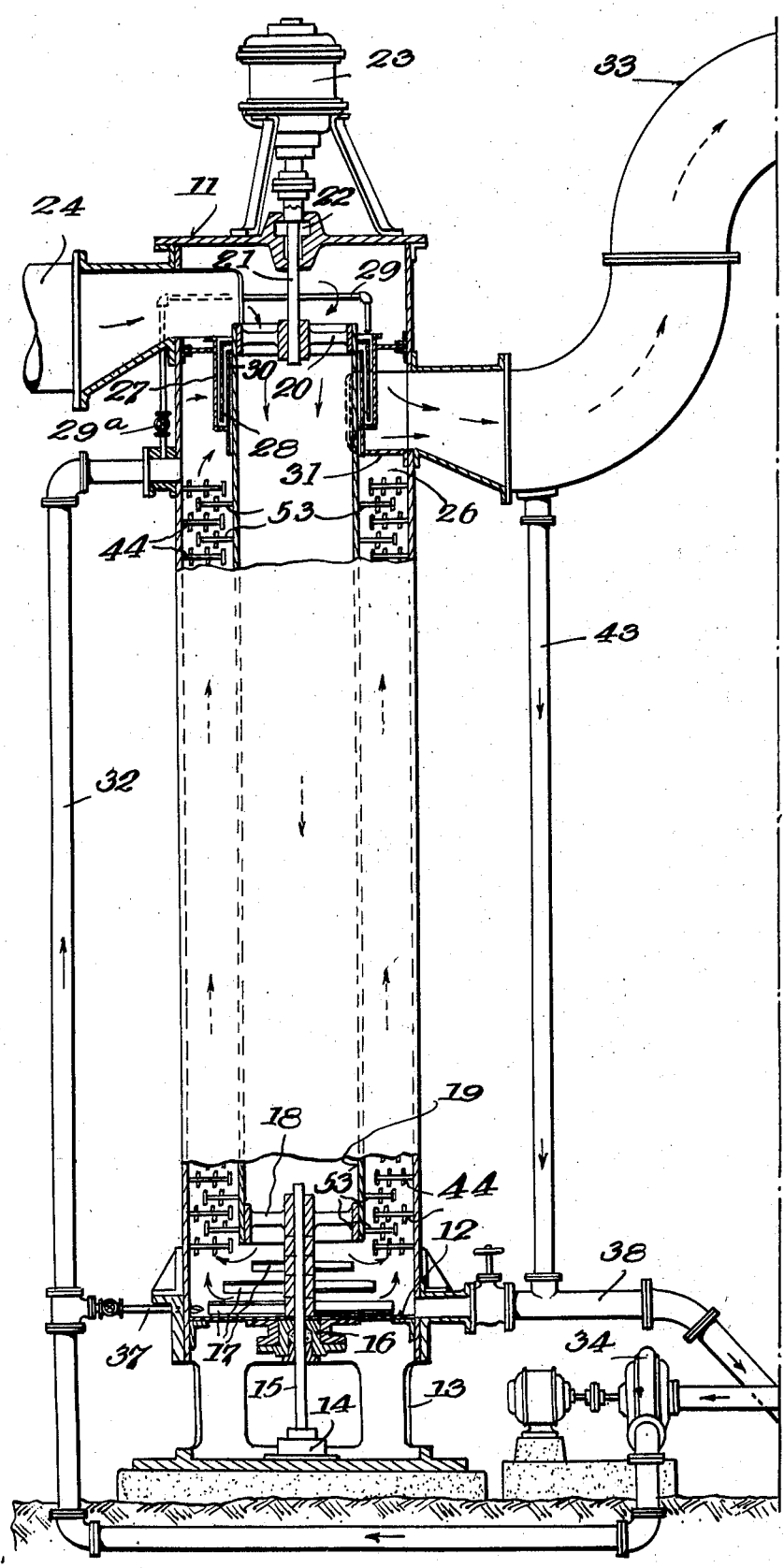
Fig. 1 is a side elevation, partly in vertical section, of the main portion of my improved gas and liquid contact apparatus.
Figure 2:
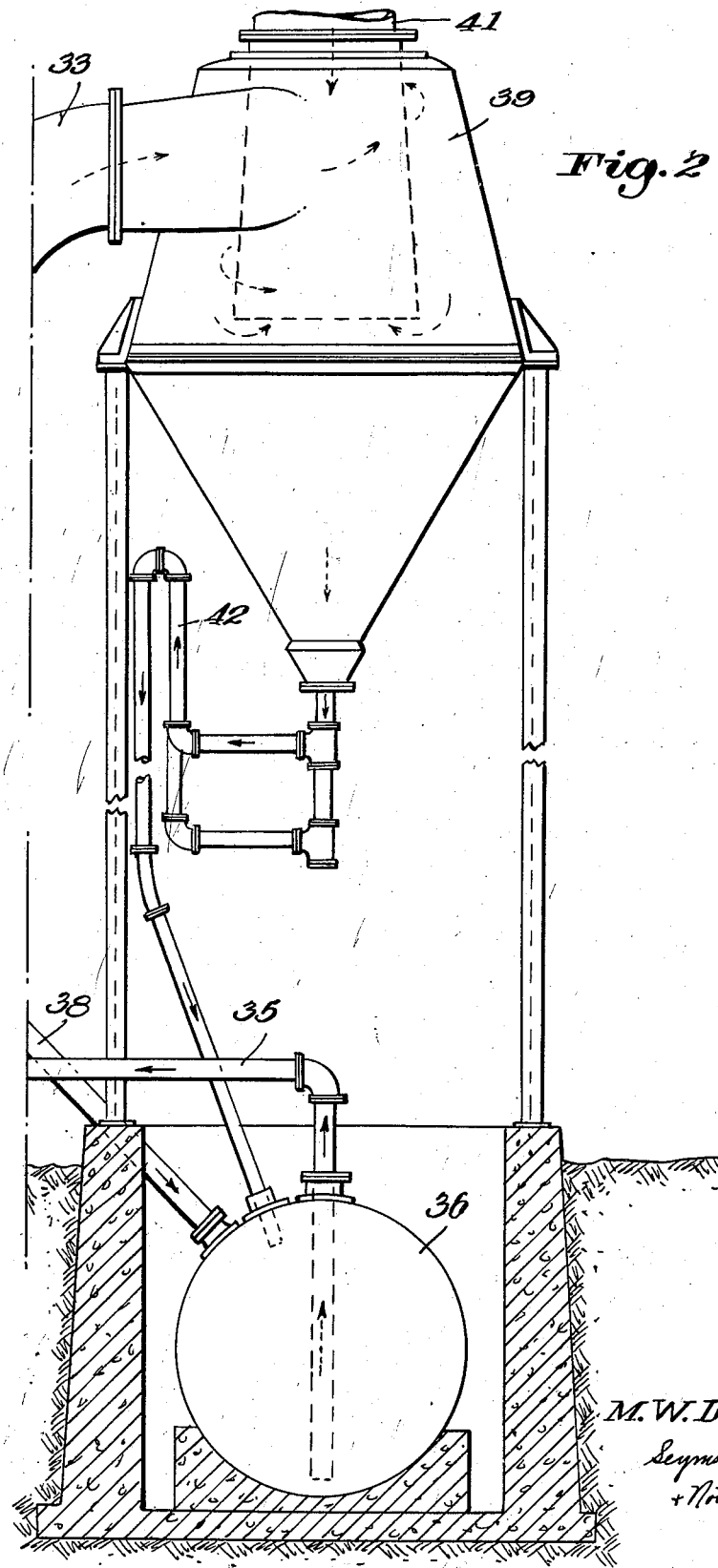
Fig. 2 is a side elevation, partially broken away, of a cyclone separator and a liquid storage tank employed in connection with such apparatus.

Referring to the drawings, 10 designates a vertically disposed cylindrical shell having a cover 11 and a bottom 12 forming a tower or casing in which the materials are treated.

The tower is supported by a pedestal or base 13 in which there is arranged a thrust bearing 14 which supports a vertical stub shaft 15, extending upwardly through a packing gland 16 at the bottom of the tower. Radially disposed vanes 17 are fixedly mounted on the shaft within the lower portion of the tower and are adapted to throw materials radially away from the shaft and toward the shell 10, for purposes hereinafter explained.

A spider 18 is fixed to the shaft and to the lower end of a tubular rotor 19; the latter extending upwardly in the tower co-axial with the shaft.

Another spider 20 is fixedly secured to the upper end portion of the rotor and to the lower end portion of a shaft 21, the latter extending upwardly through a combined packing and bearing 22, and being driven by a motor 23 mounted on the top of the tower.

Gas to be treated enters the top portion of the tower through a conduit 24 and is constrained to travel downwardly through the rotor by an annular partition 25 which closes the top portion of the annular space 26 between the rotor and shell 10, which may be considered the wall of a stator.

For sealing purposes, the partition supports an annular trough 27 into which there extends an annular skirt 28 carried by the rotor. The trough is kept filled with a sealing liquid supplied by a pipe 29 and such liquid passes from the trough into the space 26 through an overflow passage 30.

Below the trough, a baffle 31 is arranged in the space 26 to deflect rising gas toward a liquid supply pipe 32 before the scrubbed gas is discharged through a conduit 33.

The pipe 32 leads from a motor driven pump 34 supplied by liquid from a pipe 35 leading from an accumulator or tank 36.

A valved by-pass tube 37 conveys liquid from the pipe 32 into the portion of the tower for cleaning purposes.

Liquid with constituents gathered from the gas, is discharged from the lower end of the tower through a valved pipe 38 leading to the tank 36.

In order to remove any entrained liquid from gases discharging through the pipe 33, the latter is preferably connected to a cyclone separator 39 having a liquid discharge pipe 40 and a gas discharge conduit 41. The pipe 40 has interposed therein an inverted U-shaped section 42 and it leads to the tank 36. Any liquid separated from the gas in the conduit 33 can be passed through a pipe 43 to the pipe 38.

The gas to be treated enters through 24, passes downwardly through the rotor 19, radially past the vanes 17 and then upwardly through the annular passageway 26 before discharging into the pipe 33. In traveling through the space 26 it is brought into intimate contact with a suitable liquid which is supplied to the upper end portion of said space by pipe 32. In traveling upwardly the gas is finely dispersed in the liquid by means which will now be described.

Figure 4:
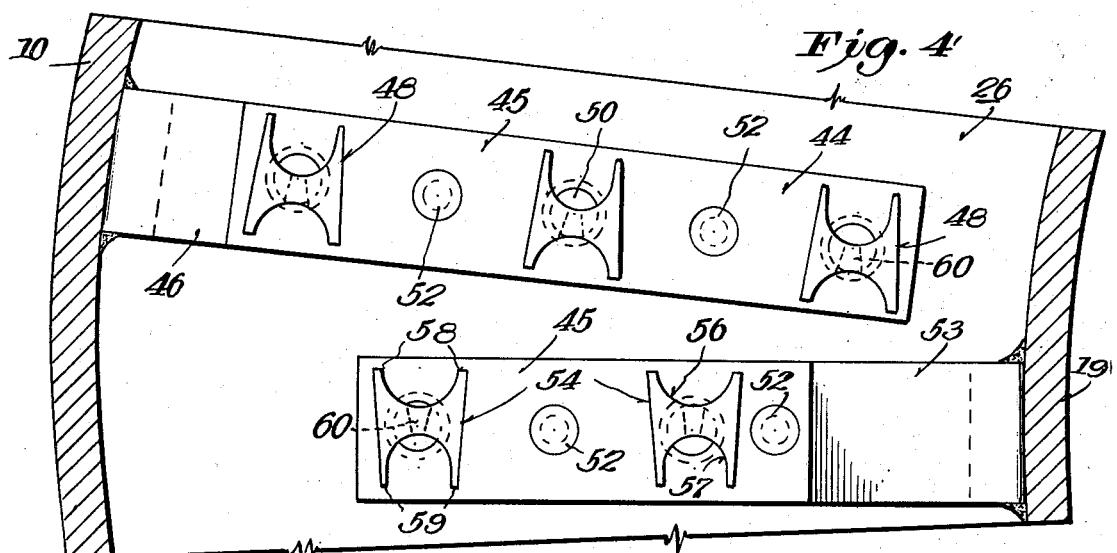
Fig. 4 is a horizontal, sectional view of the structure shown in Fig. 3.
Figure 3:
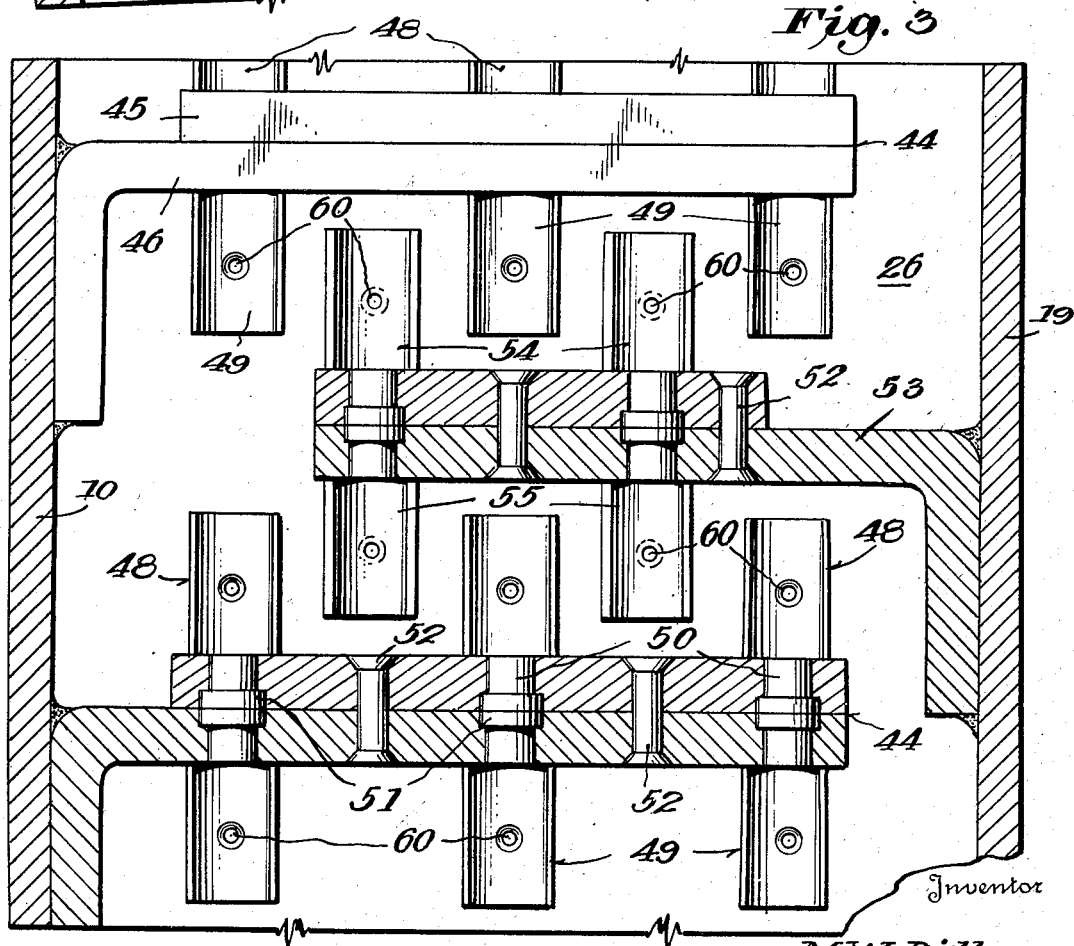
Fig. 3 is an enlarged fragmentary, vertical, sectional view, of the tower of the apparatus, partly in elevation.

The shell 10 is provided with rows of spaced arms or members 44, which preferably radiate from the axis of the rotor. Each arm, as best shown in Figs. 3 and 4, preferably consists of an upper strip 45 and a lower angular member 46, the latter being secured to the shell by any suitable means such as welding 47. The strip 45 is secured to a series of upwardly extending repulse elements or arms 48 and the member 46 is secured to a series of downwardly extending repulse elements or arms 49. Each repulse arm has a cylindrical shank 50, secured to the member which carries the arm, by upsetting the end of the shank as indicated at 51. Each strip 45 is secured to its complementary member 46 by any suitable means such as rivets 52.

The rotor is also provided with outwardly extending members or vanes 53 located at various elevations intermediate the members 44, and each vane is similar in construction to each member 44 but is secured to and extends radially from the rotor. Each vane carries upwardly extending impulse elements or arms 54 which extend into the spaces between the downwardly extending repulse elements or arms 49. Each vane also has downwardly extending impulse elements or arms 55 which extend between the upwardly projecting repulse arms. Obviously then the various impulse and repulse elements are staggered and in overlapped relation so as to effectively agitate flowable materials passing through the passageway 26. Each element or arm 48, 49, 54 and 55, is preferably substantially H-shape in cross section, having opposite grooves 56 and 57 which extend lengthwise of the arm and terminate in opposite edge portions 58 and 59. Each groove 56 is somewhat wider than the groove 57, and the wider grooves of the impulse arms confront the wider grooves of the repulse arms. For cleaning purposes, each arm has a tapered aperture 60 extending therethrough with the wider end of the aperture arranged adjacent to the wider groove of that arm. Such arms subject the materials traveling through the passageway 26 to turbulence and impact, and constrain them to come into intimate contact with one another.

In operation, assuming that the apparatus is to be employed in removing fluid constituents from a gas, the gas is introduced through the conduit 24 under any suitable pressure and is forced downwardly through the rotor until radially distributed by the vanes 17. It then travels upwardly between the tube of the rotor and the stationary shell 10 is subjected to the dispersion caused by the motion of the vanes 53. As the gas rises, it will be contacted repeatedly with the liquid flowing downwardly from the pipe 32, with the result that the liquid will absorb vapors or liquefiable constituents from the gas. The absorbent menstruum, thus enriched, will be transferred from the bottom of the tower to the tank 36 and may be recycled by the pump 34. When the liquid becomes saturated with the constituents gathered from the gas, of course, it may be passed to any conventional distillation unit so that such constituents may be recovered. Then the absorbent liquid can be returned to the tank 36 for re-use.

To allow the apparatus to be operated continuously, I may employ two tanks 36 and use them alternately, so that the liquid from one could be in the course of distillation while the liquid from the other is used for absorption purposes in the tower.

It can readily be seen that the degree of subdivision of the fluids passing through the passageway 26 is dependent to some extent upon the speed of the rotor and the velocity of the gases travelling through the apparatus. It has been found by the use of my apparatus that extremely fine dispersion of a liquid within another fluid can be obtained, and as such problems involve contact, it is easily understood that the more finely the gas particles are divided, the larger the area of the gas will be as a result of each particle being surrounded by the absorbent oil or liquid. It will also be understood that the degree of contact created by this condition is many times that obtainable by the superficial contact of gas passing along surfaces such as checker tile or wooden grids, in common use today.

The apparatus can be employed to effectively remove certain elements from gases, such as gasoline constituents from natural or refinery gases, benzol, ammonia, sulphur compounds, etc. It can also be used for the removal of dust or the like from air, blast furnace gas or other gases. In short, the apparatus may be employed in any environment where constituents are removed from a gas by causing the gas to come into intimate contact with a suitable liquid.

If the apparatus is employed for removing dust or the like from gases, the tank 36 may be replaced by one of the type shown in Fig. 5. In this arrangement the tank 36a may be elongated and provided with weirs 36b which divide the tank into segregated compartments 36c, 36d and 36e. The pipe 42a leading from the cyclone separator, and the pipe 38a leading from the tower will empty into the compartment 36c, and the dust or the like will be gathered in the chambers 36c and 36d. The liquid separated from the dust will be passed from the chamber 36e through the pipe 35a leading to the pump 16.

It will be noted that the tube 29 at the top portion of the tower is provided with a control valve 29a and may lead from the pipe 32.

Instead of vertically arranging the tower, it might be placed in inclined position or even horizontally, and in the latter modification, the liquid from the pipe 32 could be introduced into the shell 10 at several points along the length of the shell.

What I claim and desire to secure by Letters Patent is:

1. In an apparatus of the character described, a casing having an annular wall, a rotor arranged in the casing and spaced from the wall by an annular passageway, spaced first supporting members mounted on the wall, arranged in said passageway and projecting toward the rotor, spaced second supporting members carried by the rotor, projecting toward said wall and positioned between said first supporting members, spaced impulse elements carried by the second supporting members and extending toward the first supporting members, spaced repulse elements carried by the first supporting members and extending toward the second supporting members, the impulse and repulse elements being arranged in overlapping relation, and having confronting concave faces with apertures extending through the elements, means for introducing gas into said passageway at one point, means for discharging gas from the passageway at a point remote from that where the gas is introduced, a liquid discharge conduit leading from the casing at a point remote from the gas outlet, and means between the gas outlet and liquid discharge line for introducing liquid into said passageway.

2. In an apparatus of the character described, a tower having an annular wall, a tubular rotor vertically arranged in the tower and spaced from the wall by an annular passageway, first supporting members mounted on the wall and projecting toward the rotor, second supporting members carried by the rotor, projecting toward said wall and positioned intermediate the first members, upwardly and downwardly extending impulse elements carried by the second members and arranged in spaced relation, upwardly and downwardly extending repulse elements carried by the first members, the impulse and repulse elements being arranged in overlapping relation, each of said elements having a concave face and an aperture extending therethrough from the face to the opposite side of the element, a gas inlet leading into the upper portion of the casing, a gas outlet leading from the upper portion of the casing, a partition in the casing segregating the inlet from the outlet for constraining gas entering through the inlet to travel into the rotor, the lower end of the rotor being spaced from the lower end of the tower to allow gas from the rotor to enter said annular passageway, a liquid discharge pipe leading from the bottom portion of the casing, and means for introducing liquid into the upper portion of the annular passageway.

3. In an apparatus of the character described, a casing having an annular wall, a rotor arranged in the casing and spaced from the wall by an annular passageway, spaced first supporting members mounted on the wall, arranged in said passageway and projecting toward the rotor, spaced second supporting members carried by the rotor, projecting toward said wall and positioned between said first supporting members, spaced impulse elements carried by the second supporting members and extending toward the first supporting members, spaced repulse elements carried by the first supporting members and extending toward the second supporting members, the impulse and repulse elements being arranged in overlapping relation and having confronting concave faces, means for introducing gas into one end of said passageway, means for discharging gas from the other end of said passageway, a liquid discharge conduit leading from the casing at a point adjacent to the point where the gas is introduced into said passageway, and means for introducing liquid into said passageway at a point intermediate the ends thereof.

4. In an apparatus of the character described, a tower having an annular wall, a rotor vertically arranged in the tower and spaced from the wall by an annular passageway, first supporting members mounted on the wall and projecting substantially horizontally toward the rotor, second supporting members carried by the rotor projecting substantially horizontally toward said wall and positioned intermediate the first members, upwardly and downwardly extending impulse elements carried by the second members and arranged in spaced relation, upwardly and downwardly extending repulse elements carried by the first members, the impulse and repulse elements being arranged in overlapping relation and each of said elements having a concave face, means for introducing gas into the lower end of said passageway, means for discharging gas from the upper end of the passageway, a liquid discharge conduit leading from the bottom portion of the tower at the lower end of the passageway, and means for introducing liquid into said passageway between the ends thereof.

5. In an apparatus of the character described, a casing having a cylindrical wall, an open-ended tubular rotor arranged in the casing in spaced relation to said wall, supporting arms mounted on the wall and projecting toward the rotor, vanes carried by the rotor, projecting toward said wall and arranged between said arms, impulse elements carried by the vanes and extending toward the arms, repulse elements carried by the arms and extending toward the vanes, the impulse and repulse elements being arranged in overlapping relation, a gas inlet leading into one portion of the casing, a gas outlet for the casing, an annular partition in the casing arranged between the rotor and the cylindrical wall and segregating the inlet from the outlet for constraining gas entering through the inlet to travel into the rotor, a liquid discharge pipe leading from the casing at a point remote from the gas inlet and outlet, and means between the gas inlet and the liquid discharge line for introducing liquid into the casing between the rotor and said cylindrical wall.

MARVIN W. DITTO.